United States Patent [19]

Miller

[11] 4,391,430
[45] Jul. 5, 1983

[54] HYDRAULIC SERVO CONTROL SPOOL VALVE

[75] Inventor: Donald M. Miller, Sunnyside, Wash.

[73] Assignee: Battelle Memorial Institute, Richland, Wash.

[21] Appl. No.: 264,146

[22] Filed: May 15, 1981

[51] Int. Cl.³ .......................... F16K 47/04; F16K 3/32
[52] U.S. Cl. ........................................ 251/205; 138/43
[58] Field of Search ..................... 251/205; 138/42, 43

[56] References Cited

U.S. PATENT DOCUMENTS 1,678,459  7/1928  Bowland ........................... 251/205
3,472,281  10/1969  Chiba et al. ..................... 251/205 X
3,498,058  3/1970  Greune et al. ................... 251/205 X Primary Examiner—Arnold Rosenthal
Attorney, Agent, or Firm—Wells, St. John & Roberts

[57] ABSTRACT

A servo operated spool valve having a fixed sleeve and axially movable spool. The sleeve is machined in two halves to form a long, narrow tapered orifice slot across which a transverse wall of the spool is positioned. The axial position of the spool wall along the slot regulates the open orifice area with extreme precision.

10 Claims, 9 Drawing Figures

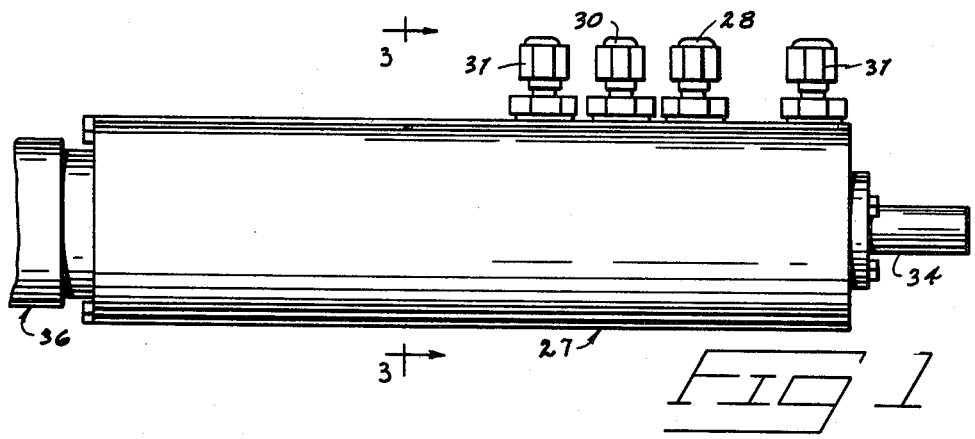
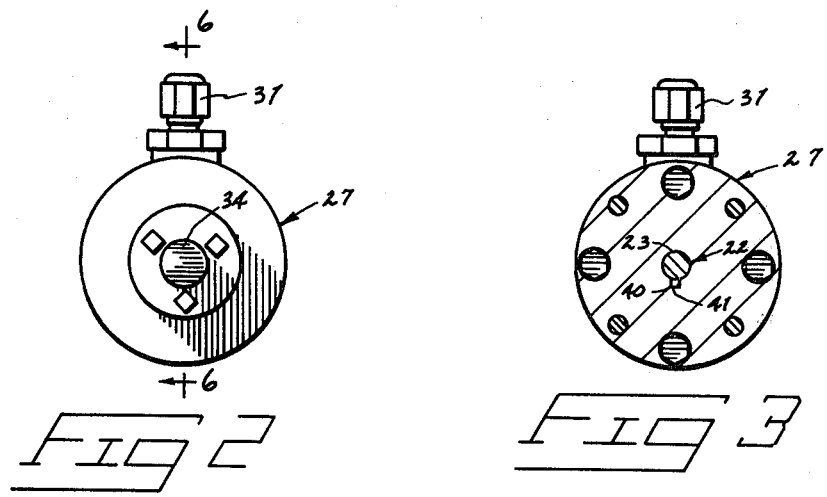
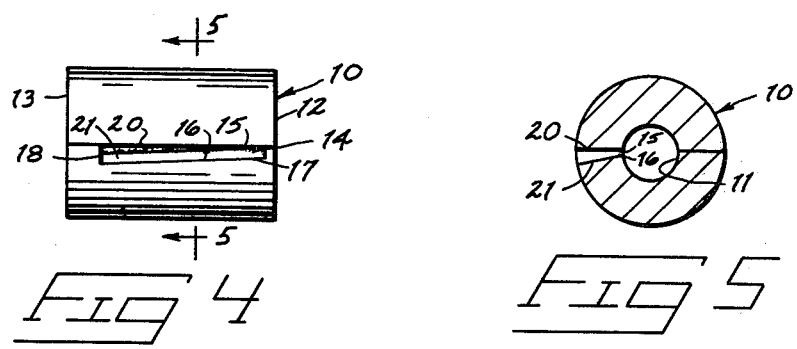

HYDRAULIC SERVO CONTROL SPOOL VALVE

TECHNICAL FIELD

This invention relates to a spool valve which is servo-operated and capable of extremely precise control of high pressure, low volume fluid flow, including flow of hydraulic liquids which typically tend to "silt" within restrictive valve orifices. The present valve lends itself to extremely high precision flow control at very small flow rates, and has the capability of producing constant liquid flow to impart constant movement to a device controlled by it.

Background Art

A description of a mechanically-actuated form of the precision machine tool construction which led to development of the present hydraulic control valve is contained in U.S. Pat. No. 4,083,272, issued Apr. 11, 1978 and titled "Omega-X Micromachining System", which is hereby incorporated into this disclosure by reference. The valve described herein might be utilized for control of the "X Axis Servo Drive" in U.S. Pat. No. 4,083,272 if adapted to hydraulic circuit control rather than the previously shown mechanical system. However, the application of the improved valve is not intended to be limited to its use in the described combination, which is simply one example of its practical utilization.

U.S. Pat. No. 3,854,352, issued Dec. 17, 1974, entitled "Pneumatically-Control Lathe System" discloses a machine tool control which includes a combination of a pneumatic and hydraulic servo system for a machine slide. It does not specifically relate to the valve structure disclosed herein. Other patents of general interest with respect to hydraulic control systems for machine tool slides are U.S. Pat. Nos. 3,555,941, issued Jan. 19, 1971 for "Tracer Control Circuit With Sizing Means", No. 3,921,479, issued Nov. 25, 1975 for "Feed Mechanism for an End-Bevel Machine", No. 3,812,761, issued May 28, 1974 for "Gear Hobbing Machines", and U.S. Pat. No. 3,353,429, issued Nov. 21, 1967 for "Hydraulic Feed Systems".

DISCLOSURE OF INVENTION

The present valve assures variable control of fluid flow at ultraprecise tolerances for accurate control of devices supplied with fluid through the valve. The valve includes a solid sleeve having an inner surface surrounding an open cavity. A long, narrow slot extends outwardly through the sleeve from a pair of elongated corner edges formed at the intersection between the sleeve inner surface and the slot. The corner edges along the slot are progressively spaced apart from one another in a linear fashion from a first slot end where they intersect one another to a second slot end where they are separated. A spool is mounted within the open cavity of the sleeve. It has an outer surface complementary in size and shape to the inner surface of the sleeve. A fluid path along the spool terminates at an end wall forming a corner edge at its intersection with the spool outer surface. This end wall is transversely positioned across the corner edges of the slot in the sleeve. The spool and sleeve are movably mounted relative to one another for adjustably locating the position of the end wall on the spool along the length of the slot. Fluid is supplied through the adjustably opened slot orifice presented between the first slot end and the location of the end wall.

It is a first object of this invention to provide a variable orifice valve for ultraprecise linear flow control characteristics over a range or operational flow rates.

Another object of this invention is to provide a variable orifice within which silting of hydraulic fluid molecules will not occur. Such silting typically occurs in very fine valve openings and tends to gradually close off the valve orifice and modify fluid flow characteristics of a conventional valve.

BRIEF DESCRIPTION OF THE DRAWINGS

FIG. 1 is a side elevation view of a complete servo valve;

FIG. 2 is an end view taken from the right in FIG. 1;

FIG. 3 is a transverse sectional view taken along line 3—3 in FIG. 1;

FIG. 4 is a side elevation view of the valve sleeve;

FIG. 5 is a transverse sectional view taken along line 5—5 in FIG. 4;

BEST MODE FOR CARRYING OUT THE INVENTION

Figure 6:
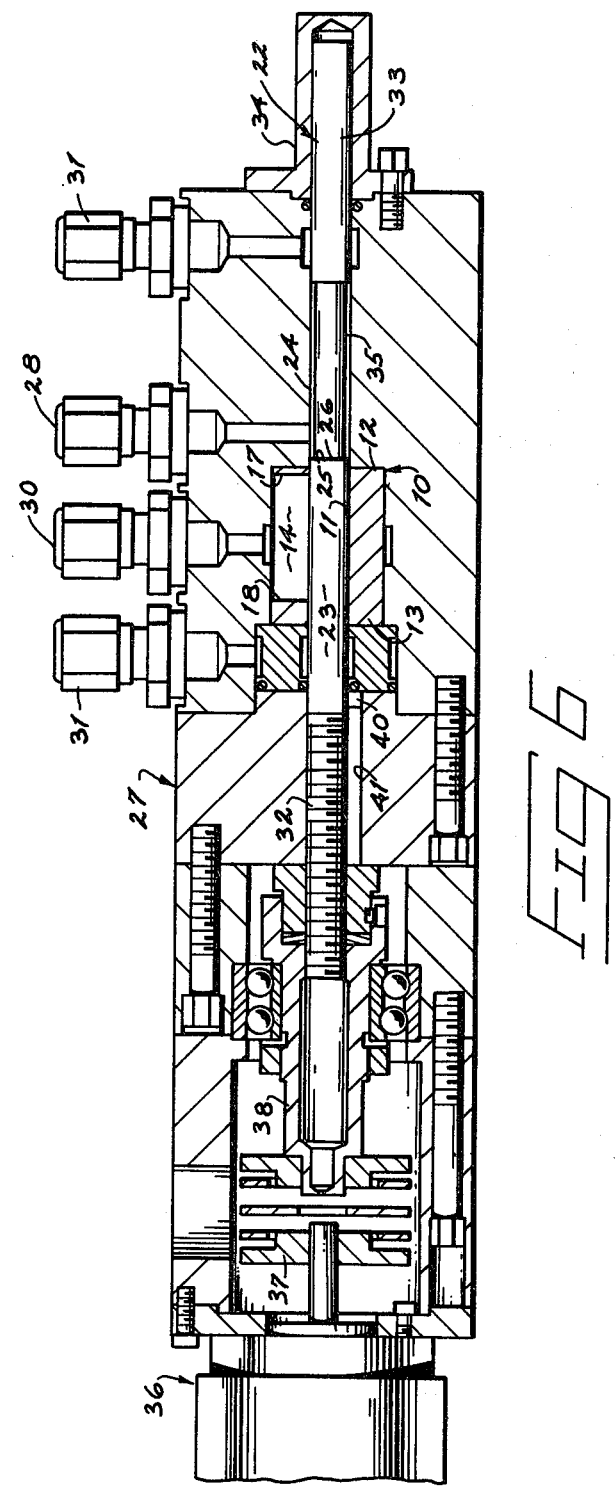
FIG. 6 is an enlarged longitudinal sectional view taken along line 6—6 in FIG. 2.

The present valve is designed for high precision control of fluid operated devices, such as a hydraulic slide control for replacement of mechanical machine tool systems such as are illustrated in U.S. Pat. No. 4,083,272. Ultraprecision machining as described in the earlier patent disclosure hinges upon extreme precision in control functions. Linear movement of a hydraulic cylinder or uniform rotational speed of a hydraulic motor depends upon control valves capable of precise maintenance of desired flow settings in variable orifice valves. Such precise control in a variable valve has been difficult to achieve in the past due to silting of oil or hydraulic fluid molecules which occurs frequently within conventional valve orifices. The silting that occurs when using conventional hydraulic servo valves at very low flow rates has impeded refinement of ultraprecise machine tools.

"Silting" is the phenomenon by which very fine valve openings are gradually closed off as large molecules of oil tend to plug them. Silting in the orifice causes the feedback system for the servo valve to call for the valve to open further. This ultimately releases the silted matter in an uncontrollable resultant surge or gush of hydraulic fluid, which is obviously unacceptable in fine control of machine elements.

The illustrated embodiment of the valve basically comprises a sleeve 10 and a spool 22. One is movably mounted with respect to the other to change the valve setting.

Sleeve 10 is cylindrical in shape. It includes an inner cylindrical surface 11 that extends from a first axial end 12 of the sleeve 10 to its second axial end 13. Located between the ends of sleeve 10 is a long, narrow, V-shaped slot 14. Slot 14 is axially directed along the cylindrical sleeve. It extends outwardly through the walls of sleeve 10 from an orifice entrance defined by a pair of straight elongated corner edges 15 and 16 formed at the intersection between the sleeve inner surface 11 and slot 14. These sharp corner edges 15 are progressively spaced apart from one another in a linear fashion between a first slot end 17 where edges 15, 16 intersect and a second slot end 18 where they are separated by a narrow distance. Slot 14 is defined by oppositely facing side walls 20 and 21 which diverge outwardly relative to each other from their respective intersections with the inner cylindrical surface 11. Thus, the inner corner edges 15 and 16 diverge from one another along the length of slot 14, and the side walls 20 and 21 diverge from one another radially outward from the inner cylindrical surface 11 to the outer surface of sleeve 10.

Spool 22 is slidably located within the open cavity defined by the inner cylindrical surface 11 of sleeve 10. The spool 22 has a cylindrical outer surface 23 complementary in size and shape to the inner surface 11 of sleeve 10. Surface 23 slidably engages surface 11. A recess 24 is provided along spool 22 which presents a fluid path leading along it to a radial end wall which presents a corner edge 26 at its intersection with the cylindrical outer surface 23 of spool 22.

The end wall 25 is transversely positioned across the entrance to slot 14. It defines one end of the variable V-shaped orifice of the valve, the other end being the apex or intersection of the respective slot corner edges 15 and 16.

Fluid directed to recess 24 under pressure will exit through the orifice formed by slot 14 and end wall 25 at a controlled flow rate which will be a function of the fluid pressure and orifice area at a given setting. Because the corner edges 15 and 16, as well as the corner edge 26, are each sharp angular corners in very close mating relationship with one another, the fluid area at the resulting entrance to the orifice can be controlled at extremely precise tolerances.

FIGS. 1 through 6 show a practical application of the first embodiment of the valve in a servo valve having a mechanical actuator for moving spool 22 to a desired position. The servo valve comprises a housing or valve body 27 which supports sleeve 10 in a fixed position. Sleeve 10 is preferably held by a shrink fit within the interior of the valve body 27. Spool 22 extends axially outward beyond both ends of sleeve 10 as shown in FIG. 6. One spool end has a cylindrical threaded surface 32. The opposite end of spool 22 comprises a cylindrical guiding section 33, which is slidably received within a complementary female extension 34 on the valve body 27.

The spool recess 24 in this embodiment comprises a coaxial cylindrical section 35 having an outer diameter less than the inside diameter of sleeve surface 11. Thus, the recess 24 is inwardly open about the entire exterior cylindrical periphery of the section of spool 22 defined by area 35. Area 35 terminates at a radial shoulder or end wall identified at 25.

Fluid is directed to the valve from a fluid inlet 28 adapted to be connected to a tube or hose in the usual manner. The fluid port associated with inlet 28 extends radially inward into body 27 at a location outward from the first end 12 of sleeve 10. This is the sleeve end toward which the walls and corner edges of the narrow V-shaped slot 14 converge to an apex.

The fluid outlet 30 of valve body 27 has a radial fluid port in open communication with the outlet slot 14. It therefore receives fluid that exits through the variable orifice formed by the movable spool 22 and stationary sleeve 10. Since at least minimal clearance will be necessary between the moving spool 22 and the stationary sleeve 10 and valve body 27, outlets 31 are provided at the axial ends of the valve body to permit escape of fluid that leaks along the length of the spool. This fluid might be returned to the low pressure side of the fluid system. The quantity of escaping fluid will be relatively constant during use of the valve and will not materially affect the precision control of fluid flow achieved by use of the valve.

Spool 22 is moved axially by a servo motor indicated generally at 36. The servo motor 36 is connected through a flexible coupling 37 to a rotatable nut 38 having cylindrical female threads complementary to the threaded end 32 of the spool 22. Spool 22 is prevented from rotating about its center axis by a projecting key 40 slidably received within a complementary keyway shown at 41.

In operation, spool 22 is moved axially within the valve body by a servo motor driven nut 38, which is engaged with the threaded end 32 of spool 22. Pressurized fluid is admitted to the valve at inlet 28, where it fills the chamber or recess along the spool section 35 with equal balanced force in all directions. The fluid therefore does not tend to shift the spool axially in one direction or the other.

As the servo motor 36 moves spool 22 to the left, as indicated by the difference in positions between FIG. 5 and FIG. 6, the corner edge 26 along the end wall 25 of the fluid chamber begins to uncover the sharp apex at the first end 17 of the open slot 14. This allows the fluid to escape through the outlet 30 for precise control of hydraulic cylinder, motor or other device (not shown).

Figure 7:
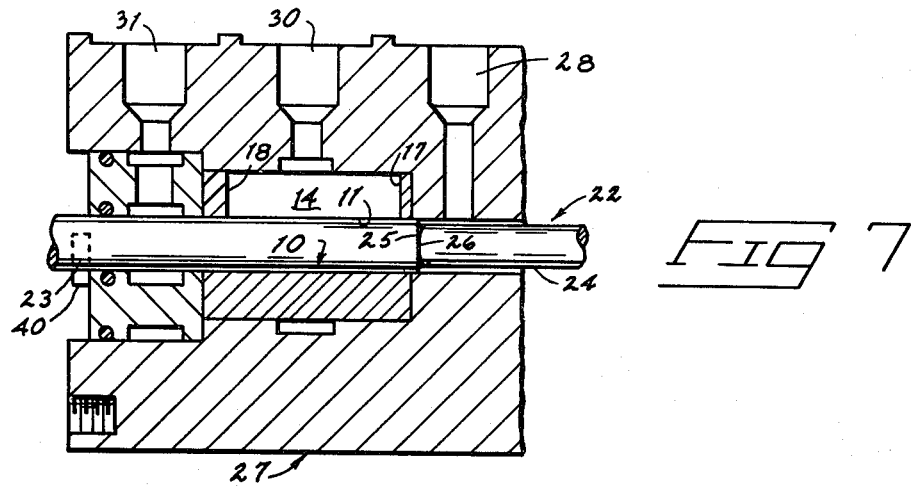
FIG. 7 is an enlarged fragmentary sectional view similar to the right hand portion of FIG. 6, illustrating one extreme operating position of the spool.
Figure 8:
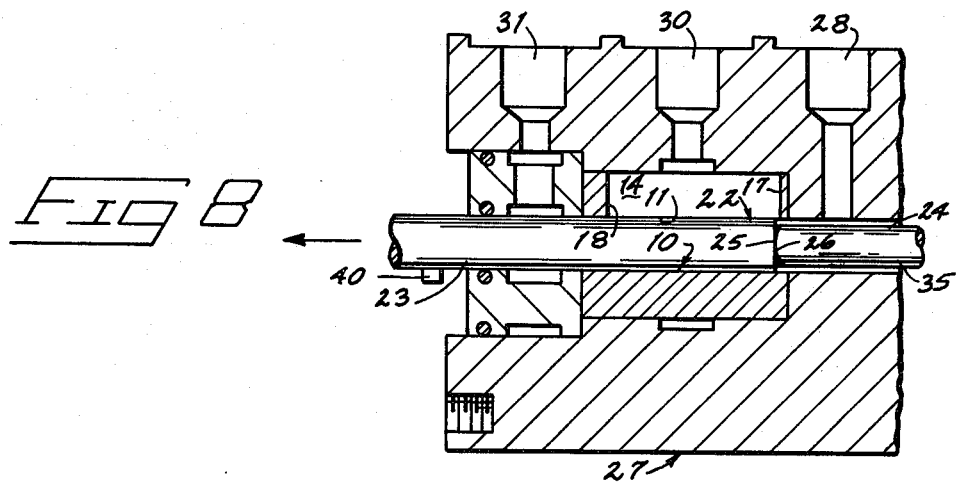
FIG. 8 is a view similar to FIG. 7, illustrating initial opening of the valve.
Figure 9:
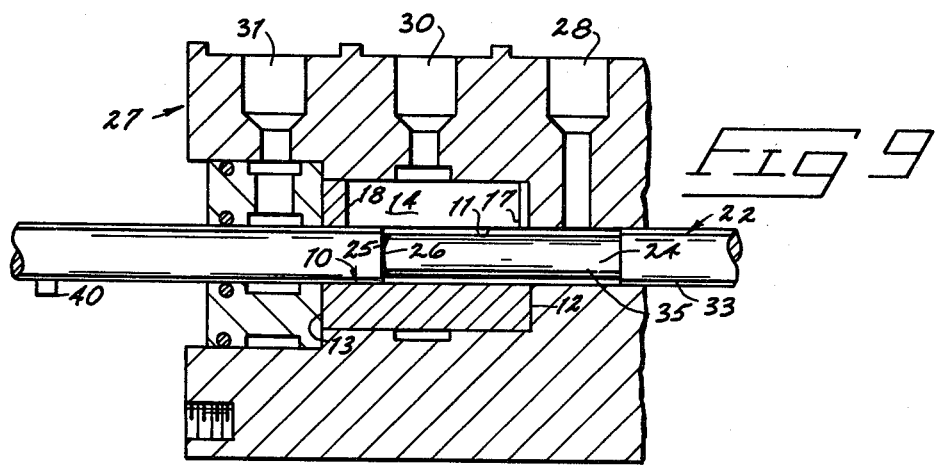
FIG. 9 is a view similar to FIG. 7, illustrating further opening of the valve.

As shown in FIG. 7, the spool 22 can be set with the end wall 25 at any axial position along the length of slot 14. The axial position of the end wall 25 will determine the area of the resulting orifice through which the fluid must pass.

The orifice presented by slot 14 can best be pictured by a study of FIGS. 4 and 5. Accurate machining of the slot walls is readily accomplished by producing a split sleeve 10 with two semicylindrical tubular segments which are subsequently joined to one another along mating radial surfaces. The slot is shown as a long, narrow-shaped opening cut along one of the radial surfaces. This machined surface serves as one slot side wall 21. The opposing slot side wall 20 is formed by the radial surface of the remaining semicylindrical sleeve segment. The side wall 21 is not radial, and therefore the two slot side walls 20 and 21 also diverge from one another in a radial direction leading outwardly from the inner cylindrical sleeve surface 11. It is believed that this divergence of the slot surfaces, by presenting a constantly enlarging exit at the orifice, helps to prevent "silting" of hydraulic fluid molecules which would otherwise tend to clog very small orifices in such a flow control valve.

Tests have been conducted to determine practical operating parameters and reliability of a servo control valve as illustrated in FIGS. 1 through 6. High pressure hydraulic fluid was routed to a six inch diameter hydraulic cylinder (not shown) through the servo valve. The linear movement of the cylinder was determined by a slide-mounted laser interferometer. Tests were run at various actuating and preloading pressures. The results, which displayed operation of the valve at a fixed orifice setting as linear movement of the controlled hydraulic cylinder, were measured at one minute intervals by visually observing the digital display of the laser interferometer, which discriminated to one microinch increments. The resulting measurements showed near straight line functioning, which can be interpreted to mean that no silting of oil molecules occurred within the valve orifice. Similar results were achieved at different orifice settings.

The above-described servo valve has several features which are necessary for the very fine machine slide movement control needed for machining of optics or other elements to tolerances measured in nanometers. First, it is adaptable to DC servo motor drives under computer control. Second, the valve is hydraulically balanced and not affected by fluid pressure loading. Third, the valve is equipped with a tapered orifice which can range in opening area from zero to a small open area over a substantial amount of travel of the valve spool.

The long tapered variable orifice in the servo valve provides the means by which a machine slide can be moved very slowly and accurately with a hydraulic cylinder as the orifice is exposed by the servo motor actuated valve spool. When combined with laser interferometer feedback in 2.54 nm increments for computer controlled servo valve actuation, the required control accuracy can be effectively accomplished.

The valve illustrated in these drawings has accurately controlled movement of a hydraulic cylinder to accuracies as fine as 2.54 nanometers (1/10 millionth inch). The nearest prior art valve is a spool-type circular orifice servo valve. These conventional valves in machine tool systems work well at 0.001 inch tolerances, but cannot approach accuracies of 1/10 millionth inch.

I claim:

1. A valve for extremely precise variable control of high pressure, low volume fluid flow of hydraulic liquids, comprising:
   a solid sleeve having an inner surface surrounding an open cavity;
   a long narrow slot extending through the sleeve from an entrance defined by a pair of elongated straight sharp corner edges formed at the intersection between the sleeve inner surface and the slot;
   said corner edges of the slot being progressively spaced apart from one another along its length in a linear fashion from a first closed slot end at which they intersect one another to a second open slot end;
   said slot being formed by a pair of elongated opposed walls extending through the sleeve and diverging radially outwardly from its inner surface;
   a spool within the open cavity of the sleeve, said spool having an outer surface complementary in size and shape to the inner surface of the sleeve;
   a fluid path on the spool, the fluid path extending from an inlet along the spool to an end wall forming a sharp corner edge at its intersection with the spool outer surface, said end wall being transversely positioned across the entrance of said slot;
   and means slidably mounting said spool and sleeve relative to one another for adjustably locating the position of said end wall along the entrance of said slot.

2. A valve as set out in claim 1 wherein the sleeve has a center axis and wherein the spool is coaxially located along said center axis.

3. A valve as set out in claim 1 wherein the sleeve has a center axis and wherein the spool is coaxially located along said center axis;
   said slot being arranged parallel to the sleeve center axis.

4. A valve as set out in claim 1 wherein the open fluid path in the spool includes an elongated open recess formed through its outer surface and overlapping the length of the slot from the first slot end to the position of said end wall.

5. A valve for variable control of fluid flow, comprising:
   a sleeve having an inner cylindrical surface arranged about a center axis;
   a long, narrow slot extending through the sleeve from an entrance defined by a pair of elongated straight sharp corner edges formed at the intersection between the sleeve inner surface and the slot;
   said corner edges of the slot being progressively spaced apart from one another along its length in a linear fashion from a first closed slot end at which they intersect one another to a second open slot end;
   said slot being formed by a pair of elongated opposed walls extending through the sleeve and diverging radially outwardly from its inner surface;
   a spool located coaxially within the sleeve, said spool having an outer cylindrical surface complementary in size and shape to the inner surface of the sleeve and slidably engaged therewith;
   an open fluid path in the spool including a radial recess extending inward from its outer surface and terminating at an end wall forming a sharp corner edge at its intersection with the spool outer surface, said end wall being transversely positionable across the entrance of said slot;
   said recess overlapping the length of the slot from the first slot end to the position of said end wall;
   and means slidably mounting said spool and sleeve relative to one another for adjustably locating the position of said end wall along the length of said slot.

6. A valve as set out in claim 5 wherein said slot is arranged parallel to said center axis;
   and means operably interengaged between the sleeve and spool for preventing relative angular movement between them about said center axis.

7. A valve for extremely precise variable control of high pressure, low volume fluid flow of hydraulic liquids, comprising:
   a sleeve having an inner cylindrical surface arranged about a center axis from a first sleeve end to a second sleeve end;
   a long, narrow, axial slot extending outwardly through the sleeve from an entrance defined by a pair of elongated straight sharp corner edges formed at the intersection between the sleeve inner surface and the slot;
   said corner edges intersecting one another at a first closed slot end spaced inwardly from the first sleeve end and diverging from one another along the length of the slot in a linear fashion toward a second open slot end spaced inwardly from the second sleeve end;
   said slot being formed by a pair of elongated opposed walls extending through the sleeve and diverging radially outwardly from its inner surface;

a spool slidably mounted within the sleeve for movement relative to the sleeve along said center axis, said spool including a section having an outer cylindrical surface complementary in size to the inner surface of the sleeve and an open radial recess extending outward therefrom toward the first end of the sleeve;

said recess being aligned with said slot and terminating at an end wall forming a sharp edge at its intersection with the spool outer surface;

said end wall of the recess being of a width at the spool outer surface greater than the maximum slot width at the sleeve inner surface and being transversely positioned across the entrance of said slot;

means mounting said spool and sleeve for effecting relative motion between them along said center axis to axially position said end wall of the recess along the length of the slot and thereby vary the orifice size presented by them between the first slot end and said end wall of the recess;

fluid inlet means in operative communication with said recess for directing fluid under pressure to said recess on the spool; and fluid outlet means in operative communication with said slot for receiving fluid passing through the orifice presented along the slot from the first closed slot end to said end wall of said recess.

8. A valve as set out in claim 1 wherein the sleeve is formed of two segments joined to one another through the slot along mating surfaces;
   at least one of said segments being cut along its mating surface to form one of the opposed walls of said slot.

9. A valve as set out in claim 5 wherein the sleeve is formed of two segments joined to one another along mating radial surfaces;
   the mating surface of one segment being machined to form a non-radial slot side wall intersecting the radial mating surface of the remaining segment to present a constantly enlarging exit at the orifice defined by the slot on the sleeve and recess on the spool.

10. A valve as set out in claim 7 wherein the sleeve is formed of two segments having complementary semi-cylindrical inner surfaces, the two segments being joined to one another along mating radial surfaces;
    the mating surface of one segment being machined to form a non-radial slot side wall intersecting the radial mating surface of the remaining segment to present a constantly enlarging exit at the orifice defined by the slot on the sleeve and recess on the spool.

* * * * *